(12) United States Patent
Kawamura et al.

(10) Patent No.: US 9,205,833 B2
(45) Date of Patent: Dec. 8, 2015

(54) CONTROL DEVICE FOR HYBRID VEHICLE

(71) Applicant: Nissan Motor Co., Ltd., Yokohama, Kanagawa (JP)

(72) Inventors: Hiroaki Kawamura, Sagamihara (JP); Kaori Tanishima, Isehara (JP); Fumihiro Yamanaka, Hiratsuka (JP); Yutaka Takamura, Yokohama (JP); Munetoshi Ueno, Atsugi (JP); Noboru Kudo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/354,301

(22) PCT Filed: Oct. 29, 2012

(86) PCT No.: PCT/JP2012/077845
§ 371 (c)(1),
(2) Date: Apr. 25, 2014

(87) PCT Pub. No.: WO2013/062124
PCT Pub. Date: May 2, 2013

(65) Prior Publication Data
US 2014/0303822 A1    Oct. 9, 2014

(30) Foreign Application Priority Data

Oct. 28, 2011    (JP) ................. 2011-237010

(51) Int. Cl.
| | |
|---|---|
| *B60L 15/00* | (2006.01) |
| *B60W 20/00* | (2006.01) |
| *B60K 6/48* | (2007.10) |
| *B60K 6/547* | (2007.10) |
| *B60L 11/14* | (2006.01) |
| *B60W 10/02* | (2006.01) |

(Continued)

(52) U.S. Cl.
CPC .............. *B60W 20/40* (2013.01); *B60K 6/48* (2013.01); *B60K 6/547* (2013.01); *B60L 11/14* (2013.01); *B60L 15/2054* (2013.01); *B60W 10/02* (2013.01); *B60W 10/06* (2013.01); *B60L 2270/145* (2013.01); *B60Y 2300/429* (2013.01); *B60Y 2300/77* (2013.01); *Y02T 10/48* (2013.01); *Y02T 10/6221* (2013.01); *Y02T 10/70* (2013.01); *Y02T 10/7077* (2013.01);

(Continued)

(58) Field of Classification Search
CPC ..... B60W 20/40; B60W 10/06; B60W 10/02; Y10S 903/93
USPC ........................................................ 701/22
See application file for complete search history.

(56) References Cited

FOREIGN PATENT DOCUMENTS

| JP | 2007-69817 A | 3/2007 |
|---|---|---|
| JP | 2007-131071 A | 5/2007 |

(Continued)

*Primary Examiner* — Mary Cheung
*Assistant Examiner* — Michael Berns
(74) *Attorney, Agent, or Firm* — Global IP Counselors, LLP

(57) ABSTRACT

A hybrid vehicle control device includes an engine start control section that begins an engine start control when a mode transition request to change to a hybrid vehicle mode occurs due to an accelerator operation while traveling in an electric vehicle mode in which a first clutch is opened. The engine start control section begins engagement of the first clutch after slip engagement of a second clutch is determined and starting the engine using a motor as a starter motor. A negative slip detecting/predicting section detects/predicts if a slip polarity of the second clutch has transitioned from positive slip to negative slip after the engine start control has begun and before the engine has started. A forced backup start control section starts the engine with the second clutch in a fully engaged state when a transition of the second clutch to negative slip has been detected or predicted.

7 Claims, 11 Drawing Sheets

(51) Int. Cl.
B60W 10/06 (2006.01)
B60L 15/20 (2006.01)

(52) U.S. Cl.
CPC ............. *Y02T 10/7275* (2013.01); *Y02T 10/84* (2013.01); *Y10S 903/93* (2013.01)

(56) References Cited

FOREIGN PATENT DOCUMENTS

| | | |
|---|---|---|
| JP | 2007-160990 A | 6/2007 |
| JP | 2008-179283 A | 8/2008 |

1

CONTROL DEVICE FOR HYBRID VEHICLE

CROSS-REFERENCE TO RELATED APPLICATIONS

This application is a U.S. National stage application of International Application No. PCT/JP2012/077845, filed Oct. 29, 2012, which claims priority to Japanese Patent Application No. 2011-237010 filed in Japan on Oct. 28, 2011, the contents of which are hereby incorporated herein by reference.

BACKGROUND

1. Field of the Invention

The present invention relates to a hybrid vehicle control device that executes an engine start control with a one-motor, two-clutch power train system.

2. Background Information

In the prior art, there is a hybrid vehicle having a one-motor, two-clutch power train system in which when a mode transition request to change to a hybrid vehicle mode occurs while the vehicle is traveling in an electric vehicle mode with a first clutch CL1 open, a second clutch CL2 put into slip and, afterwards, engagement of a first clutch CL1 is started such that the engine is started using the motor as a starter motor (for example, see Japanese Laid Open Patent Application No. 2008-179283). In the following explanation, an electric vehicle mode is called "EV mode" and the hybrid vehicle mode is called "HEV mode."

SUMMARY

Object the Invention to Achieve

With the conventional hybrid vehicle control device, a problem that will now be explained occurs if a slip polarity of the second clutch transitions from positive slip to negative slip after the engine start control begins.

(a) After an engine start ends, a pull-in shock occurs due to a sudden change in deceleration G when the second clutch is made to engage from the negative slip state.

(b) When the rotational speed difference reverses from negative slip to positive slip, the second clutch passes through an engaged state in which there is no rotational speed difference. A momentary pulse torque is transmitted through the second clutch and causes a shock to occur.

In particular, since the slip polarity of the second clutch becomes negative slip under conditions where a driver is not requesting drive force and a shock is easily felt, there is a high demand to reduce shock that occurs abruptly due to a change of the slip polarity. Here, "positive slip" refers to a rotational speed difference state in which the input rotational speed of the second clutch is higher than the output rotational speed, and "negative slip" refers to a rotational speed difference state in which the output rotational speed of the second clutch is higher than the input rotational speed.

The present invention was conceived in view of the problem explained above and its object is to provide a hybrid vehicle control device that can prevent a shock from occurring when the slip polarity of the second clutch changes to negative slip after the engine start control has begun.

In order to realize the object described above, the hybrid vehicle control device of the present invention has an engine, a motor, a first clutch, a second clutch, and an engine start control section. The first clutch is disposed between the engine and the motor. The second clutch is disposed between the motor and a drive wheel. The engine start control section is configured to begin an engine start control when a mode transition request to change to a hybrid vehicle mode occurs due to an accelerator operation while traveling in an electric vehicle mode in which the first clutch is opened, the engine start control section beginning engagement of the first clutch after slip engagement of the second clutch is determined and starting the engine using the motor as a starter motor. The engine start control section has a negative slip detecting/predicting section and a forced backup start control section. The negative slip detecting/predicting section detects or predicts if a slip polarity of the second clutch has transitioned from positive slip to negative slip after the engine start control has begun. The forced backup start control section starts the engine with the second clutch in a fully engaged state when a transition of the second clutch to negative slip has been detected or predicted.

Consequently, when the engine start control is begun based on a mode transition request to change to the hybrid vehicle mode while traveling in the electric vehicle mode with the first clutch open, the engine is started while maintaining the second clutch in slip engagement. After the engine start control has begun, if the negative slip detecting/predicting section detects or predicts that the second clutch will transition to negative slip, then the forced backup start control section starts the engine with the second clutch in a fully engaged state. That is, the engine start control is begun when the slip polarity of the second clutch goes to a positive slip state due to an accelerator operation. However, after the engine start control is begun, if it is detected or predicted that the slip polarity of the second clutch will go to negative slip, then the forced backup start control is begun to eliminate the rotational speed difference and put the second clutch into the fully engaged state. With this forced backup start control, a shock caused by a change of the slip polarity can be prevented because the second clutch is put into a state in which the slip polarity does not change (fully engaged state). As a result, a shock occurring when the slip polarity of the second clutch transitions to negative slip after the engine start control begins can be prevented.

BRIEF DESCRIPTIONS OF THE DRAWINGS

Referring now to the attached drawings which form a part of this original disclosure.

Figure 12:
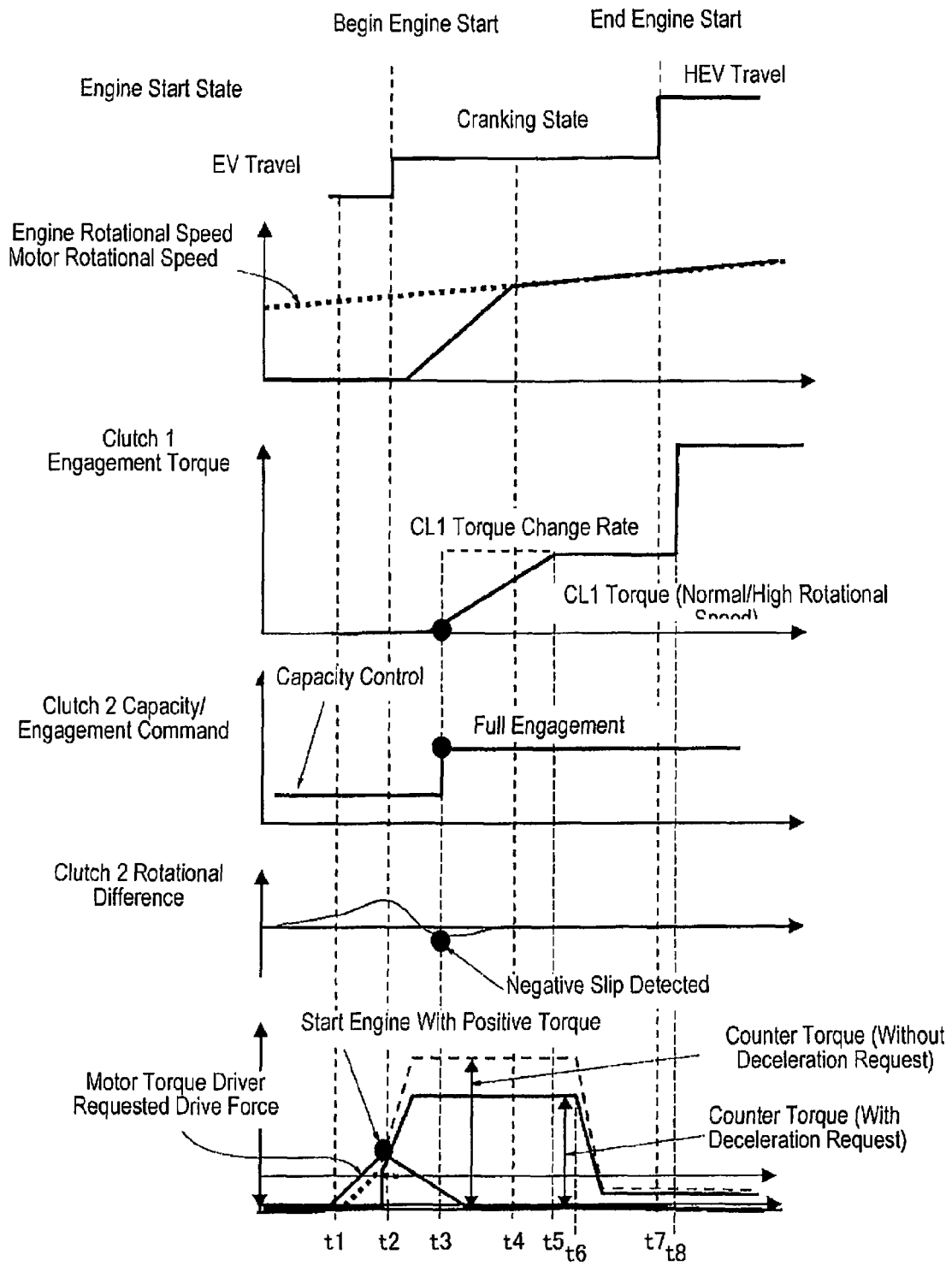

FIG. 12 is a time chart showing the following characteristics when the vehicle changes from EV travel to HEV travel through the engine start control according to Embodiment 1: engine start state, engine rotational speed, motor rotational speed, clutch 1 engagement torque, clutch 2 capacity/engagement command, clutch 2 rotational speed difference, motor torque, and driver requested drive force.

Figure 13:
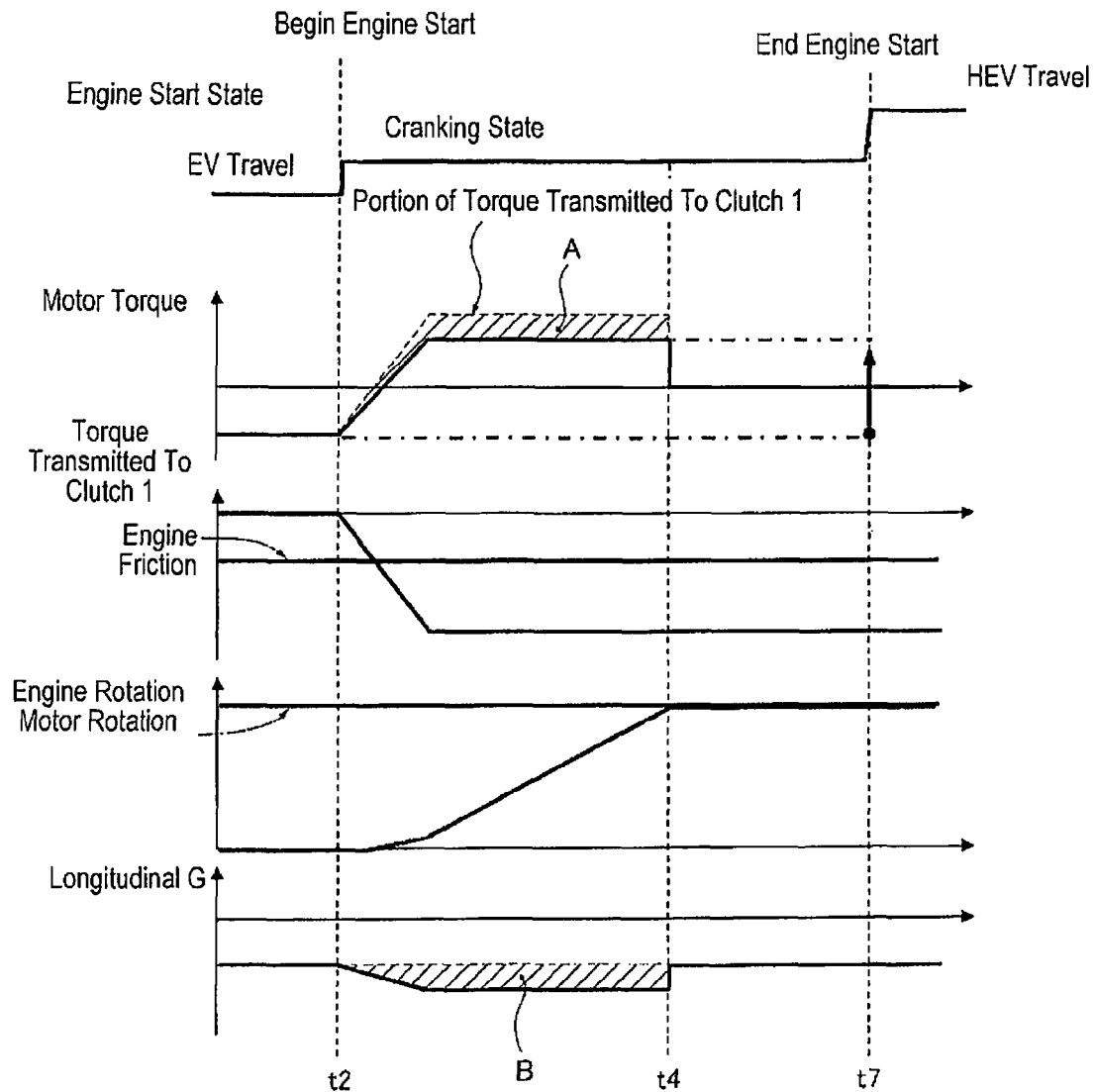

FIG. 13 is a time chart showing the following characteristics when a deceleration request from the driver occurs during cranking with the second clutch in the fully engage state in Embodiment 1: engine start state, motor torque (counter torque), torque transmitted to clutch 1, engine friction, engine rotational speed, motor rotational speed, and longitudinal G.

Figure 14:
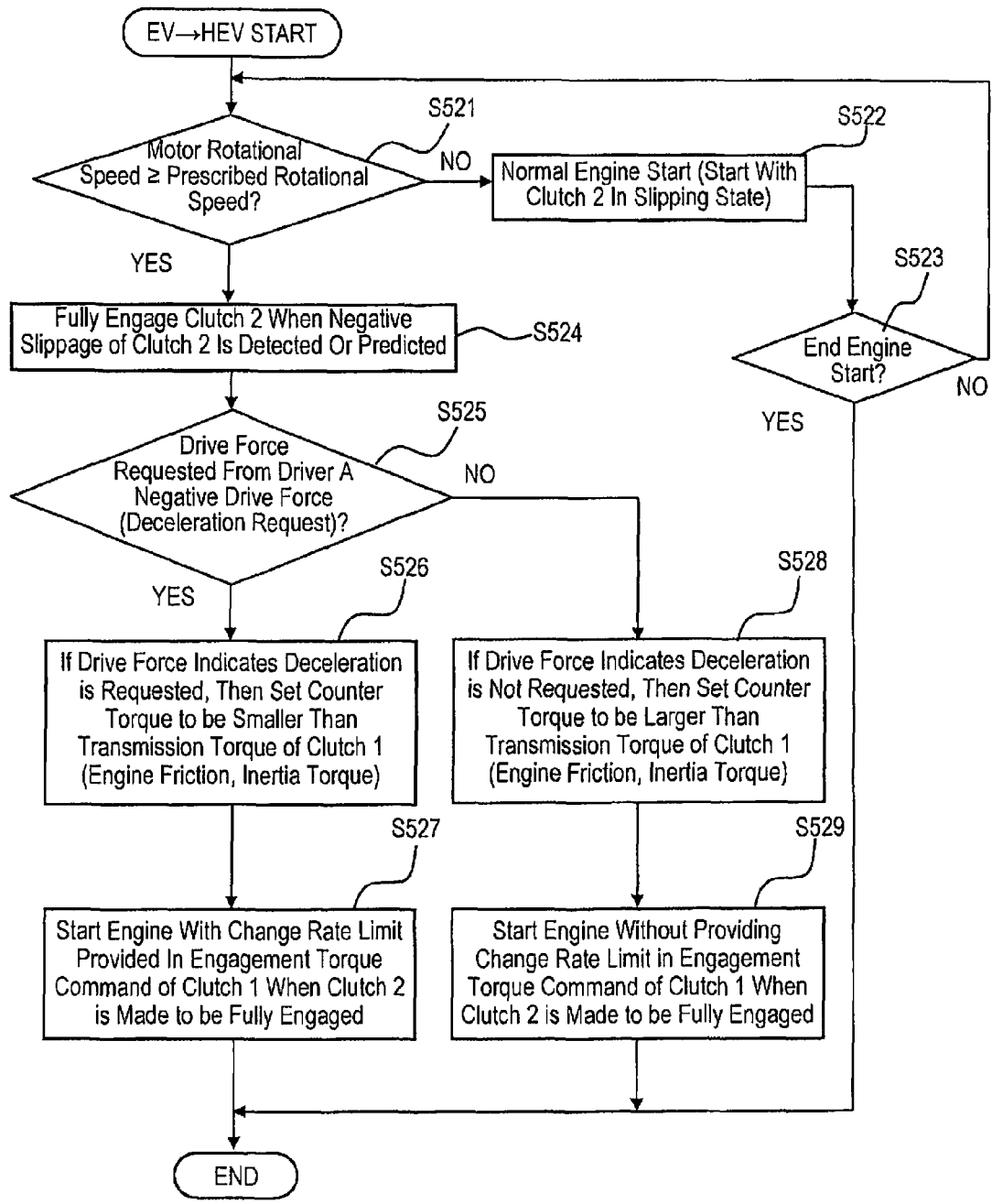

FIG. 14 is a flowchart illustrating the flow of an engine start control process executed by the integrated controller according to Embodiment 2 when a request for a transition from EV to HEV mode occurs.

Figure 15:
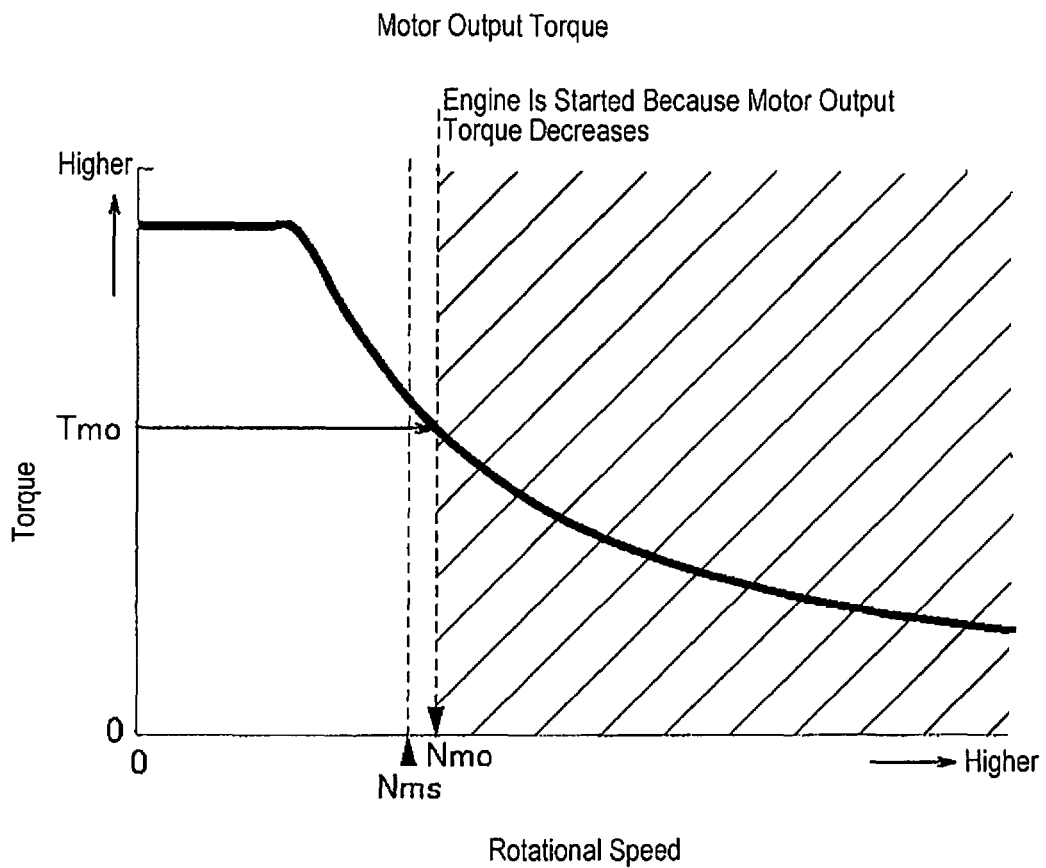

FIG. 15 is a motor torque diagram showing motor torque versus motor rotational speed for explaining an example of predicting that the second clutch will enter negative slip during the engine start control process according to Embodiment 2.

DETAILED DESCRIPTION OF THE EMBODIMENTS

The optimum embodiment for realizing the hybrid vehicle control device in the present invention will now be explained with reference to Embodiments 1 and 2 of the present invention illustrated in the drawings.

Embodiment 1

First, the configuration will be explained. The configuration of the hybrid vehicle control device according to Embodiment 1 will be explained separately regarding the power train system configuration, the control system configuration, the integrated controller configuration, the integrated control process configuration, and the engine start control process configuration.

Power Train System Configuration

Figure 1:
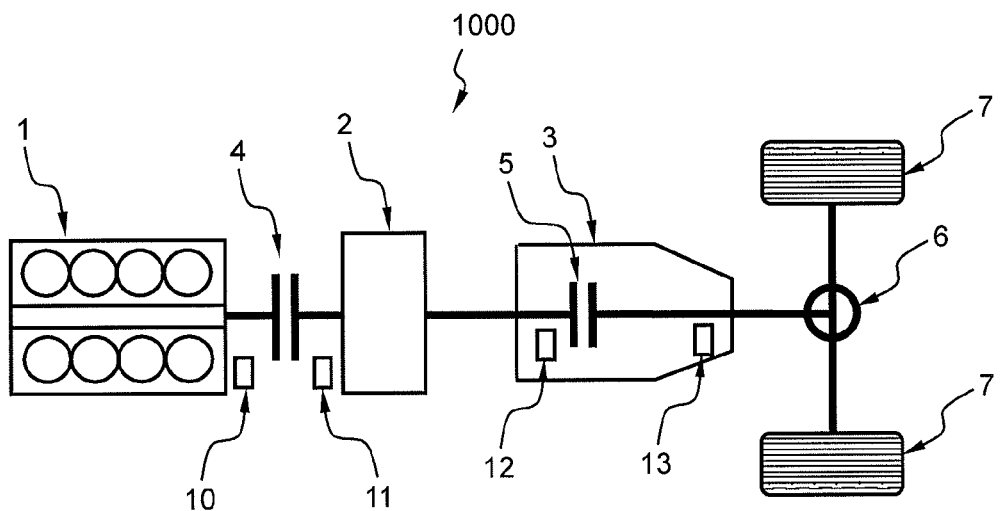
FIG. 1 is a schematic plan view showing a power train system of a hybrid vehicle in which a hybrid vehicle control device in accordance with an Embodiment 1 of the present invention can be applied.

FIG. 1 shows the power train system of a hybrid vehicle in which a control system according to Embodiment 1 has been applied. The configuration of the power train system will now be explained with reference to FIG. 1.

As shown in FIG. 1, the power train system of the hybrid vehicle in Embodiment 1 comprises an engine 1, a motor/generator 2 (motor), an automatic transmission 3, a first clutch 4, a second clutch 5, a differential gear unit 6, and tires 7 (drive wheels). The engine 1, the motor 2, the automatic transmission 3, the first clutch 4 and the second clutch 5 are collectively referenced by the reference numeral 1000.

The hybrid vehicle of Embodiment 1 has a power train system configuration, comprising an engine, one motor and two clutches. The running modes include an "HEV mode" achieved by engagement of the first clutch 4, an "EV mode" achieved by disengagement of the first clutch 4, and a "WSC mode" in which the vehicle travels with the second clutch 5 in a slip engagement state.

An output shaft of the engine 1 described above and an input shaft of the motor/generator 2 (abbreviated as "MG") are connected to each other via the variable-torque-capacity first clutch 4 (abbreviated as "CL1").

The output shaft of the motor/generator 2 is connected to an input shaft of the automatic transmission 3 (abbreviated as "AT").

The automatic transmission 3 is a transmission having a plurality of gears and an output shaft connected via the differential gear unit 6 to the tires 7 and 7. The automatic transmission 3 is configured to execute automatic shifting in which the gear is selected automatically according to vehicle speed VSP and the accelerator opening position APO and manual shifting in which a driver selects the gear.

One of the engagement elements, i.e., variable-torque-capacity clutches and brakes, that carry out power transmission inside the transmission unit in different states corresponding to the shift states of the automatic transmission 3 is used as the second clutch 4 (abbreviated as "CL2"). As a result, the automatic transmission 3 synthesizes the power of the engine 1 inputted via the first clutch 4 and the power inputted from the motor/generator 2 and outputs the synthesized power to the tires 7 and 7.

For example, the first clutch 4 and the second clutch 5 can be made of a dry-type multiple plate clutch or a wet-type multiple plate clutch that allow for continuous control of the hydraulic fluid flow rate and the hydraulic pressure by means of a proportional solenoid. The power train system has two operation modes corresponding to the connection state of the first clutch 4. In the disengaged state of the first clutch 4, the power train system is in the "EV mode" in which the vehicle runs with only the power of the motor/generator 2; in the engaged state of the first clutch 4, the power train system is in the "HEV mode" in which the vehicle runs with both the power of the engine 1 and the power of the motor/generator 2.

Provided in the power train system are the following parts: a CL1 input rotation sensor 10 that detects the input rotational speed of the first clutch 4, a CL1 output rotation sensor 11 that detects the output rotational speed of the first clutch 4 (=CL2 input rotational speed=motor rotational speed), a CL2 output rotation sensor 12 that detects the output rotational speed of the second clutch 5, and an AT output rotational speed sensor 13 that detects the output shaft rotational speed of the automatic transmission 3.

Control System Configuration

Figure 2:
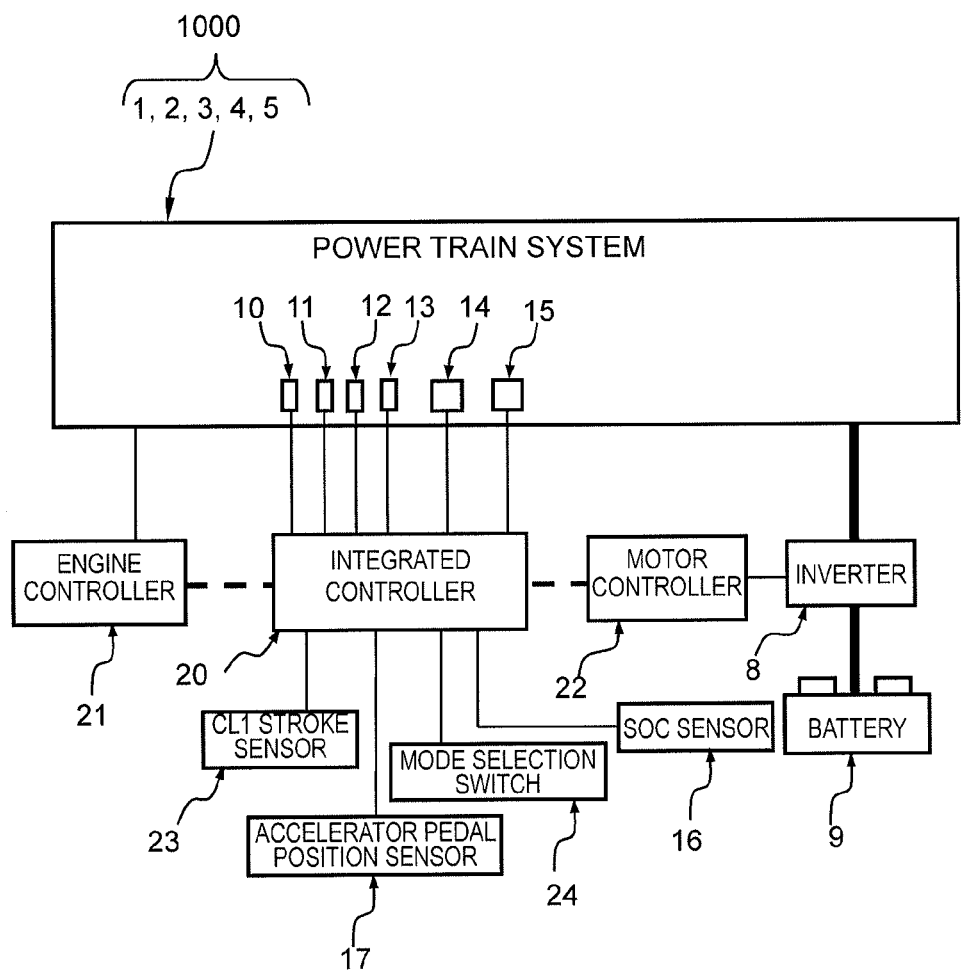
FIG. 2 is a block diagram illustrating the hybrid vehicle control device in which the controller according to Embodiment 1 of the present invention can be applied.

FIG. 2 is a diagram illustrating the control system of the hybrid vehicle wherein the control device according to Embodiment 1 is utilized. The configuration of the control system will be now explained with reference to FIG. 2.

As shown in FIG. 2, the control system according to Embodiment 1 comprises an integrated controller 20, an engine controller 21, a motor controller 22, an inverter 8, a battery 9, a solenoid valve 14, a solenoid valve 15, an accelerator position opening sensor 17, a CL1 stroke sensor 23, a SOC sensor 16, and a transmission mode selection switch 24.

The integrated controller 20 executes integrated control of operating points of the constituent elements of the power train system. The integrated controller 20 selects an operation mode that can realize the drive torque desired by the driver based on the accelerator position opening APO, the battery state of charge SOC, and the vehicle speed VSP (proportional to the rotational speed of the output shaft of the automatic transmission). Then, the target MG torque or the target MG rotational speed is transmitted to the motor controller 22; the target engine torque is transmitted to the engine controller 21, and the driving signal is transmitted to the solenoid valves 14 and 15.

The engine controller 21 controls the engine 1. The motor controller 22 controls the motor/generator 2. The inverter 8 drives the motor/generator 2. The battery 9 stores the electric energy. The solenoid valve 14 controls the hydraulic pressure of the first clutch 4. The solenoid valve 15 controls the hydraulic pressure of the second clutch 5. The accelerator pedal position sensor 17 detects the accelerator position opening (APO). The CL1 stroke sensor 23 detects the stroke of a clutch piston of the first clutch 4 (CL1). The SOC sensor 16 detects the state of charge of the battery 9. The transmission mode selection switch 24 switches between an automatic transmission mode in which transmission gears are shifted in response to the vehicle speed VSP and the accelerator position opening APO, and a manual transmission mode in which the driver selects the transmission gear manually.

Integrated Controller Configuration

Figure 3:
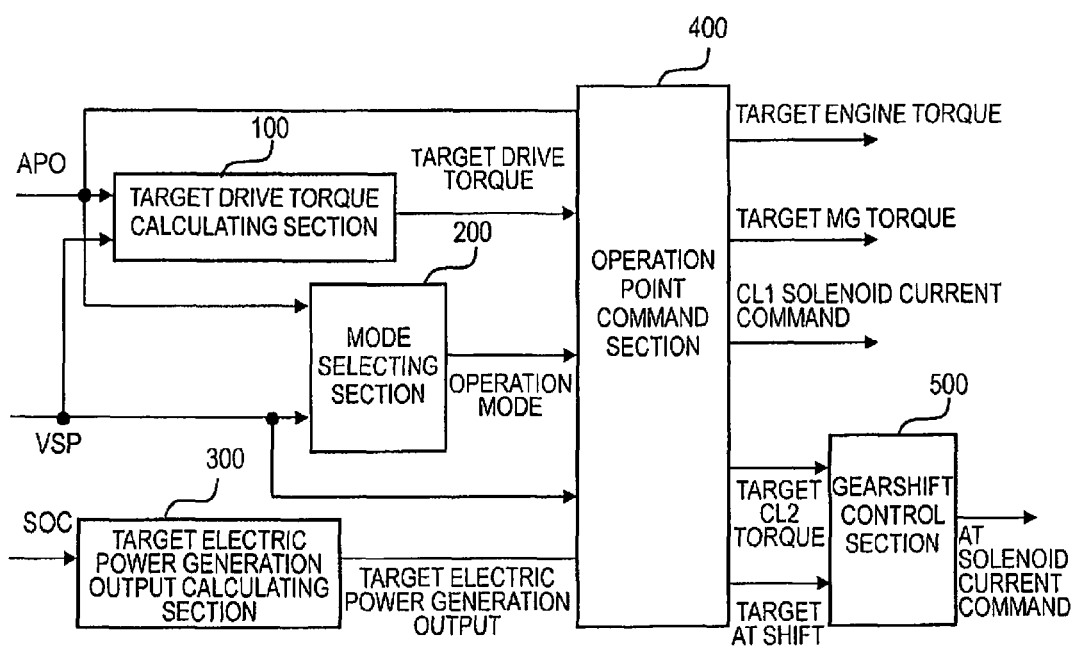
FIG. 3 is a block diagram illustrating the operation of the integrated controller in Embodiment 1 of the present invention.
Figure 4:
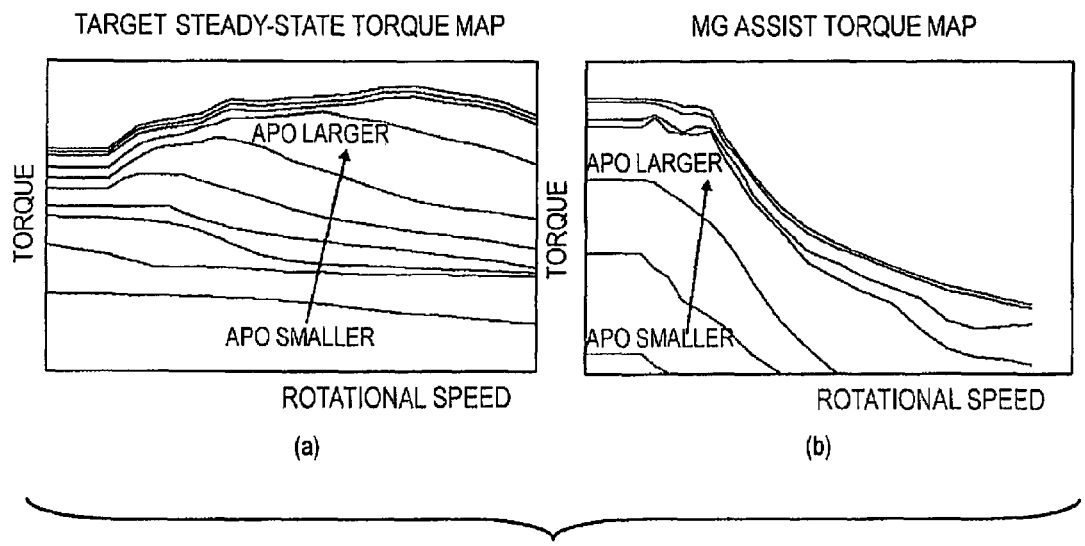
FIG. 4 is a map diagram including a target steady-state torque map (a) and an MG assisted torque map (b) utilized in the control system of Embodiment 1 of the present invention.

FIG. 3 is a block diagram illustrating the control process of the integrated controller 20 according to Embodiment 1. The configuration of the integrated controller 20 will now be explained with reference to FIGS. 3-8.

As shown in FIG. 3, the integrated controller 20 comprises a target drive force calculating section 100, a mode selecting section 200, a target electric power generation output calculating section 300, an operating point command section 400, and a gear shift control section 500.

The target drive force calculating section 100 uses the target steady-state drive force map shown in FIG. 4(a) and the MG assisted drive force map shown in FIG. 4(b) to calculate a target steady-state drive force and an MG assist drive force from the accelerator position opening APO and the vehicle speed VSP.

Figure 5:
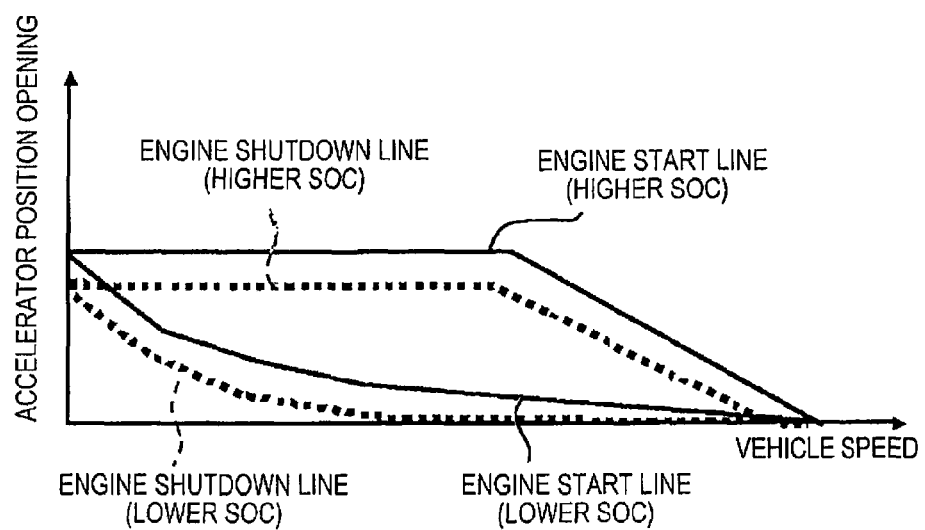
FIG. 5 is a map diagram illustrating the engine startup/shutdown line map utilized in the controller in Embodiment 1 of the present invention.

The mode selecting section 200 uses an engine startup/shutdown line map set according to the accelerator position versus the vehicle speed as shown in FIG. 5 to calculate the operation mode (HEV mode or EV mode). The engine startup lines and the engine shutdown lines are set as characteristics that decrease in a direction of smaller accelerator position openings APO as the battery state of charge SOC decreases, as indicated by the representative characteristics of the engine startup lines (high SOC, low SOC) and the engine shutdown lines (high SOC, low SOC) shown in the figure.

Figure 6:
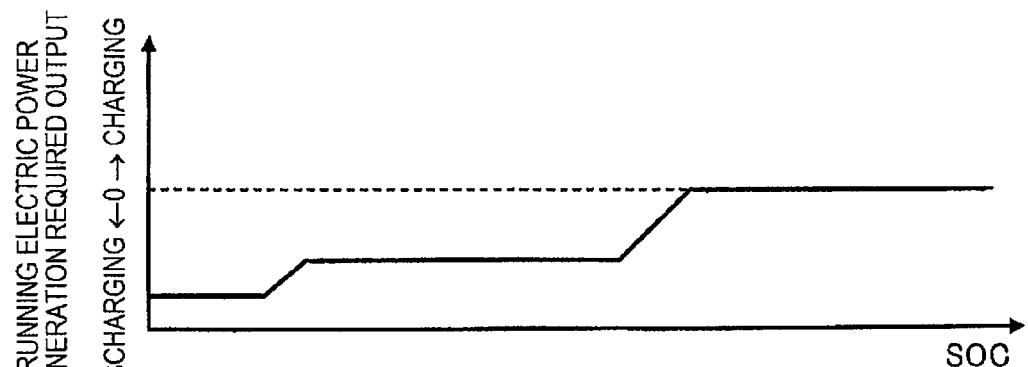
FIG. 6 is a diagram illustrating the characteristics of the electric power generation output required while the vehicle is running with respect to the state of charge SOC utilized in the controller of Embodiment 1 of the present invention.
Figure 7:
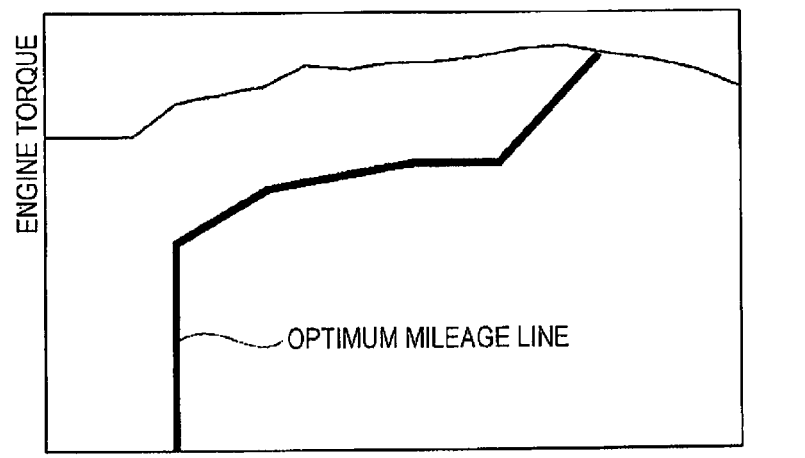
FIG. 7 is a diagram illustrating the characteristics of the optimum mileage line of the engine utilized in the controller of Embodiment 1 of the present invention.

The target electric power generation output calculating section 300 uses the in-running electric power generation required output map shown in FIG. 6 to calculate the target electric power generation output from the state of charge SOC. Also, the output needed for increasing the engine torque from the current operating point to the optimum mileage line shown in FIG. 7 is calculated and compared to the target electric power generation output described above, and the lower output is added as the required output to the engine output.

The operating point command section 400 receives the accelerator position opening APO, the target steady-state torque, the MG assist torque, the target mode, the vehicle speed VSP, and the required electric power generation output as input. Then, with this input information taken as an operating point arrival target, the transient target engine torque, the target MG torque, the target CL2 torque capacity, the target gear ratio, and the CL1 solenoid current command are calculated.

Figure 8:
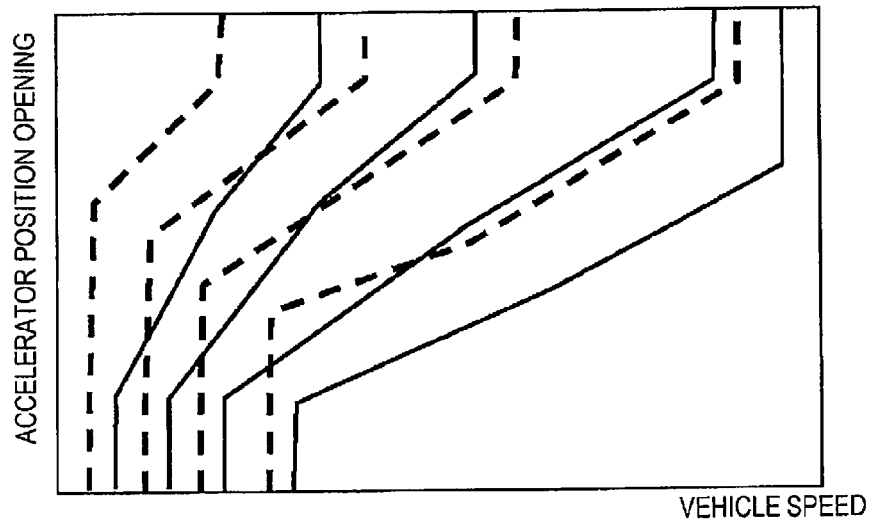
FIG. 8 is a space charge map diagram illustrating an example of the space charge line in the automatic transmission of Embodiment 1 of the present invention.

Based on the target CL2 torque capacity and the target gear ratio, the gear shift control section 500 drives and controls the solenoid valves in the automatic transmission 3 so that the capacity and gear ratio are reached. FIG. 8 is a diagram illustrating an example of the gear shift line map utilized in the gear shift control. Based on the vehicle speed VSP and the accelerator position opening APO, a determination is made regarding the next gear shift step from the current gear shift step; if there is a request for the gear shift, the gear shift clutch is controlled to make the gear shift.

Integrated Control Process Configuration

Figure 9:
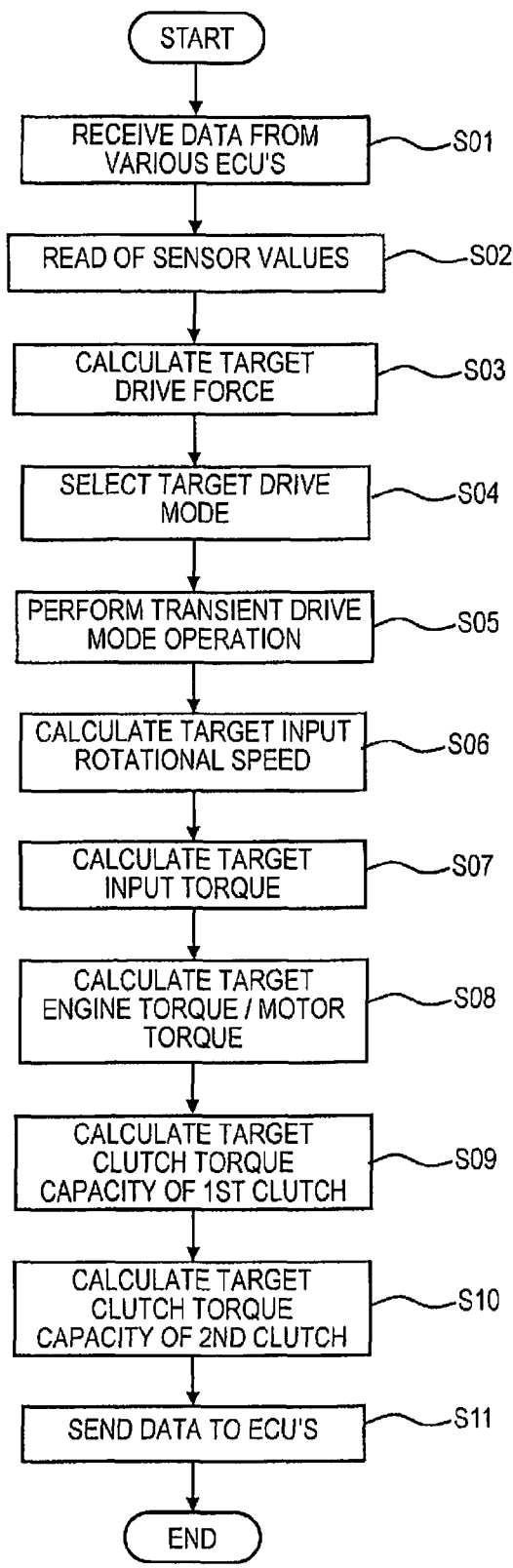
FIG. 9 is a flowchart illustrating the configuration and flow of the integrated control process executed in the integrated controller of Embodiment 1 of the present invention.

FIG. 9 shows the flow of the integrated control process carried out by the integrated controller 20 in Embodiment 1. The integrated control process configuration will now be explained with reference to FIG. 9 and FIG. 10.

In step S01, the data are received from the various control apparatuses. Then, in the next step S02, the sensor value is read, and the information needed for the later control process is obtained.

In step S03, in continuation of reading sensor values in step S02, the target drive force is calculated based on the vehicle speed VSP, the accelerator position opening APO, and a braking force. Control then proceeds to step S04.

Figure 10:
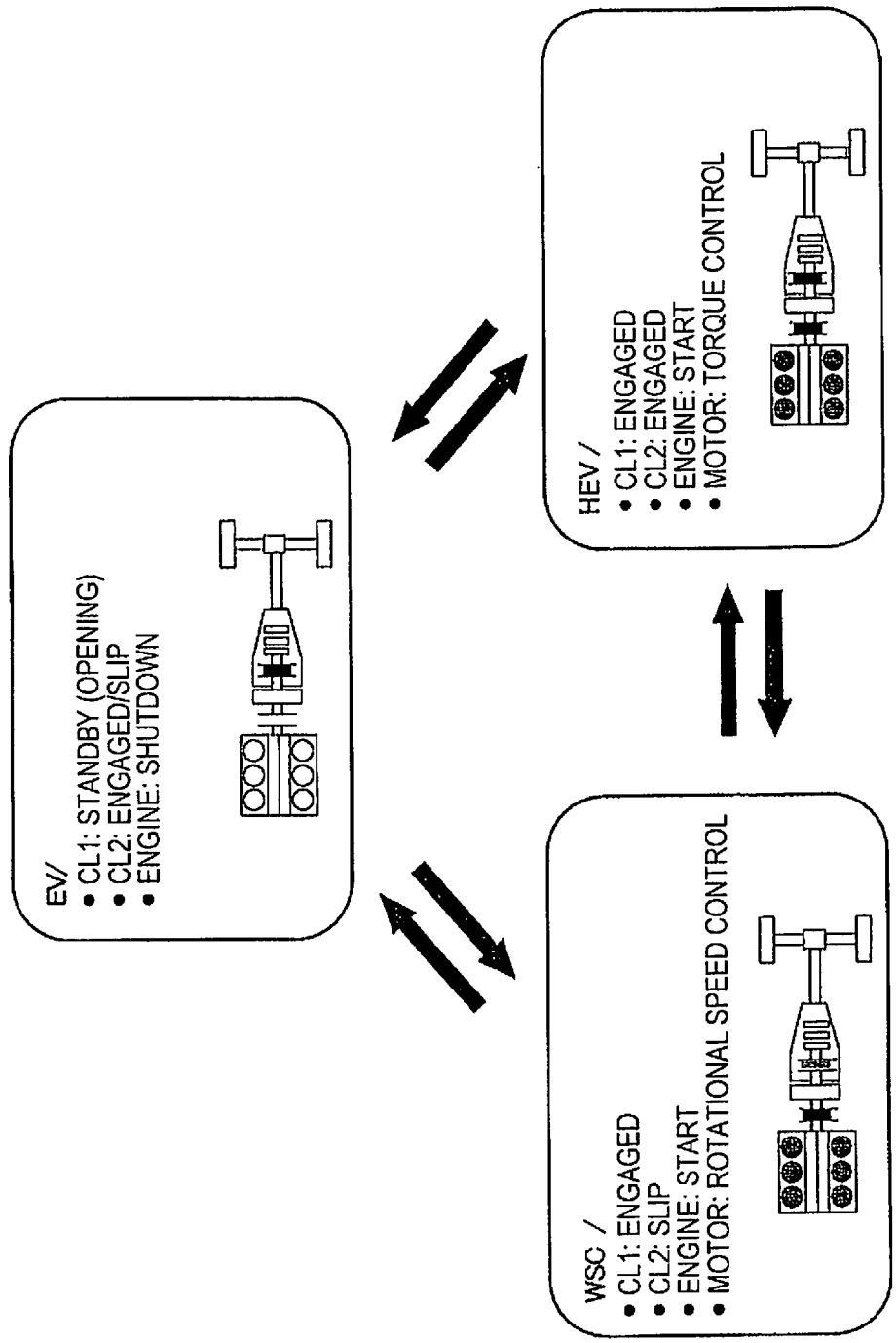
FIG. 10 is a diagram illustrating an example of the target running mode transition in the target running mode control process executed in step S04 shown in FIG. 9.

In step S04, in continuation of calculating the target drive force carried out in step S03, the target running mode is selected according to the target drive force, the state of charge SOC, the accelerator position opening APO, the vehicle speed VSP, the road gradient, and other vehicle states. Control then proceeds to step S05. As a reference, FIG. 10 shows an excerpt of the target running mode in which mutual transition takes place between the "EV mode," the "HEV mode," and the "WSC mode." In step S04, an engine start is executed when a mode transition from the "EV mode" to the "HEV mode" or the "WSC mode" is selected.

In step S05, in continuation of the target running mode control process in step S04, a transient running mode is computed if a mode transition request to switch among the running modes has occurred, the computation involving, for example, selecting a motor control mode and an engine start timing according to the states of the first clutch 4 (CL1) and the second clutch 5 (CL2) at the time of engine starting. Control then proceeds to step S07. Here, the transient running mode computation includes an engine start control process based on a mode transition request to transition from the "EV mode" to the "HEV mode" (see FIG. 11).

In step S06, in continuation of the transient running mode computation executed in step S05, a target input rotational speed is calculated according to the running mode state and the motor control state determined in step S05. Control then proceeds to step S08.

In step S07, in continuation of the target input rotational speed calculating in step S06, a target input torque is calculated in consideration of the target drive force and the protection of the various types of devices. Control then proceeds to step S08.

In step S08, in continuation of the target input torque calculating in step S07, a torque distribution with respect to the engine 1 and the motor/generator 2 is determined and respective target values for each are calculated in consideration of an electric power generation request and the target input torque calculated in step S07. Control then proceeds to step S09.

In step S09, in continuation of the target engine torque/motor torque calculating in step S08, a target clutch torque capacity of the first clutch 4 (CL1) is calculated according to a command determined in the transient running mode computation of step S05. Control then proceeds to step S10.

In step S10, in continuation of the target first-clutch torque capacity calculating in step S09, a target clutch torque capacity of the second clutch 4 (CL2) is calculated according to the CL2 slip rotational speed and the running mode state determined in step S05. Control then proceeds to step S11.

In step S11, in continuation of the target second-clutch torque capacity calculating in step S10, the data are sent to each controller and then the process ends.

Engine Start Control Process Configuration

Figure 11:
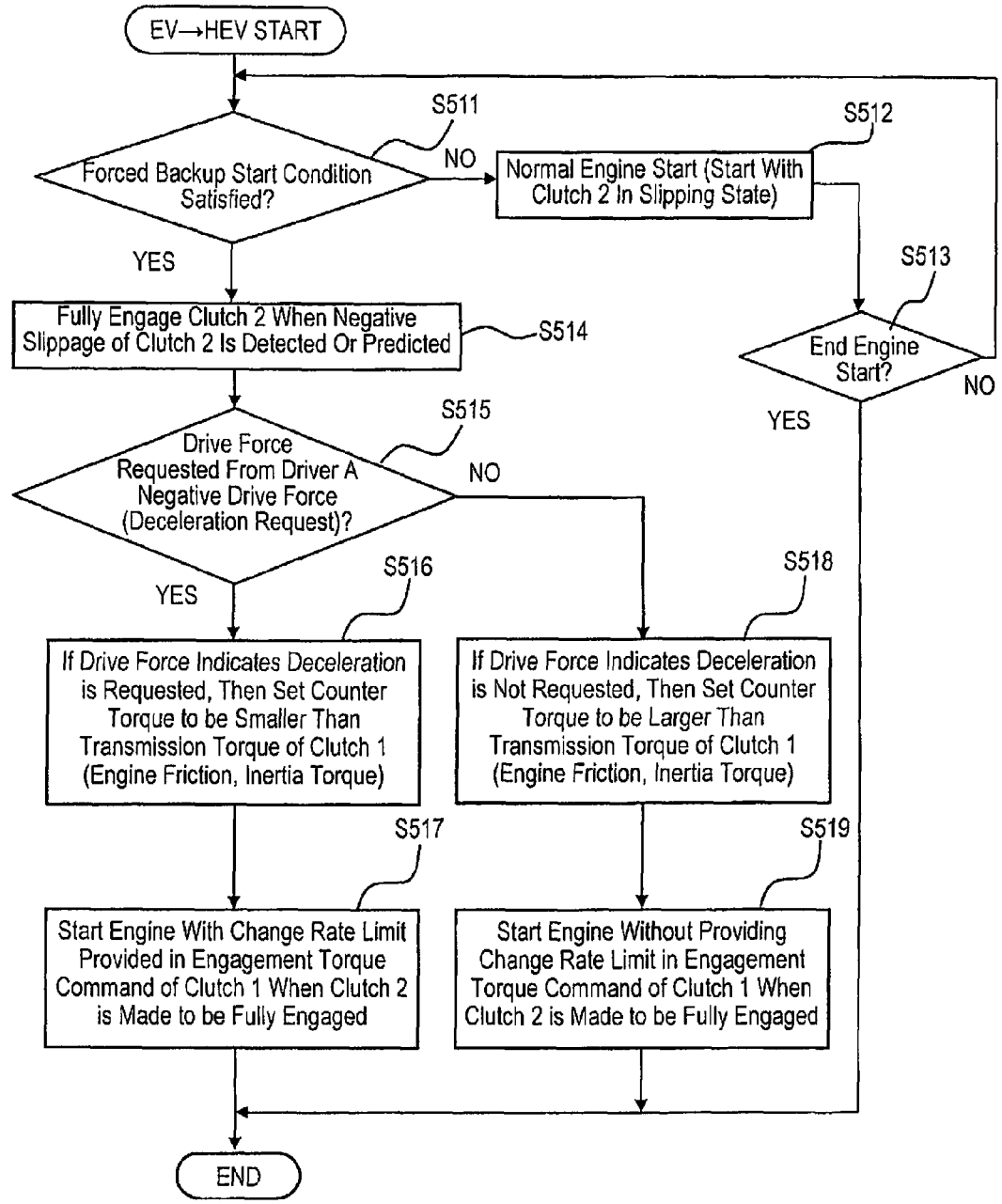
FIG. 11 is a flowchart illustrating the flow of an engine start control process executed by the integrated controller according to Embodiment 1 when a request for a transition from EV to HEV mode occurs.

FIG. 11 shows the flow of the engine start control process executed by the integrated controller 20 according to Embodiment 1 during an EV→HEV mode transition request (engine start control means). The engine start control process configuration will now be explained based on FIG. 11. The counter engine start control process begins when a mode transition request for changing to the "HEV mode" occurs during the "EV mode" in response to an accelerator operation (accelerator position opening>0) occurring while the target drive force is a positive torque.

In step S511, in continuation of the EV→HEV mode transition request or the determination that engine start control is in progress in step S513, it is determined if a forced backup start condition is satisfied. If YES (forced backup start condition is satisfied), then control proceeds to step S514. If NO (forced backup start condition is not satisfied), then control proceeds to step S512 (negative slip detecting/predicting section). In Embodiment 1, the forced backup start condition includes the following three conditions:

(a) First speed is selected in manual transmission mode

Condition (a) is added as a condition in which the input rotational speed of the second clutch 5 becomes high.

(b) Negative slip of second clutch 5 is detected

Condition (b) is the main condition and involves determining a slip amount (rotational speed difference) of the second clutch 5 based on a difference between the input rotational speed and the output rotational speed of the automatic transmission 3 and the gear ratio of the first speed, and detecting if the slip amount is below a negative slip determination value (rotational speed difference determination value).

(c) Vehicle speed≥setting value

The condition (c) is added to prevent executing the forced backup start when the vehicle is in a low speed region (vehicle speed<setting value) because there is a concept of push out.

When these three conditions are all satisfied, the forced backup start condition is determined to be satisfied.

In step S512, in continuation of the determination that the forced backup start condition is not satisfied in step S511, normal engine start control (starting the engine with the second clutch 5 in a slip state) is executed, and control proceeds to step S513.

In step S513, in continuation of the execution of normal engine start control in step S512, it is determined if the engine start control has been completed. If YES (engine start control completed), then control proceeds to the end of the process. If NO (engine start control in progress), then control returns to step S511.

In step S514, in continuation of the forced backup start condition being satisfied in step S511, the second clutch 5 is put into a fully engaged state and control proceeds to step S515.

In step S515, in continuation of the full engagement of the second clutch 5 in step S514, determination is made as to whether the drive force request from the driver is negative (deceleration request). If YES (driver is requesting deceleration), then control proceeds to step S516. If NO (driver not requesting deceleration), then control proceeds to step S518. The drive force request from the driver is determined by monitoring the change direction of the accelerator position opening APO. If an accelerator return operation or an accelerator release operation is performed immediately after an accelerator depression operation such that the accelerator position opening APO is changing in a decrease direction, then it is determined that a driver deceleration request exists. Meanwhile if the accelerator depression amount is held or the accelerator is operated in a direction of increasing depression amount such that the accelerator position opening APO is being maintained or the accelerator position opening APO is changing in an increase direction, then it is determined that a driver deceleration request does not exist.

In step S516, in continuation of the determination that a driver deceleration request exists in step S515, a counter torque outputted from the motor/generator 2 is set to be smaller than a transmitted torque of the first clutch 4 (engine friction and inertia torque). Control then proceeds to step S57. The counter torque is a reaction torque that counter balances the transmitted torque (=input torque) of the first clutch 4 during cranking In step S517, in continuation of outputting a counter torque smaller than the transmitted torque of the first clutch 4 in step S516, the engine 1 is cranked while providing a change rate limit in an engagement torque command for engaging the first clutch 4 when the second clutch 5 is fully engaged. When the starting of the engine 1 is completed, control proceeds to the end of the process.

In step S518, in continuation of determining that a driver deceleration request does not exist in step S515, the counter torque outputted from the motor/generator 2 is set to be larger than the transmitted torque of the first clutch 4 (engine friction and inertia torque). Control then proceeds to step S519.

In step S519, in continuation of the counter torque output being set larger than the transmitted torque of the first clutch 4 in step S518, the engine 1 is cranked while not providing a change rate limit in the engagement torque command for engaging the first clutch 4 when the second clutch 5 is fully engaged. When the starting of the engine 1 is completed, control proceeds to the end of the process. Step S514 to step S519 correspond to the forced backup start section.

Operational actions will now be explained. The operational action of the hybrid vehicle control device according to Embodiment 1 will be explained separately regarding the engine start control process action, the forced backup start control action, and the deceleration realization action with respect to a driver deceleration request.

Engine Start Control Process Action

When the forced backup start condition is not satisfied, the following sequence of steps of the flowchart shown in FIG. 11 is repeated: step S511→step S512→step S513. If the engine start control is completed with the forced backup start condition remaining not satisfied, then the following sequence of steps of the flowchart shown in FIG. 11 are repeated: step S511→step S512→step S513 END.

That is, if the engine start control is completed without the forced backup start condition being satisfied, then the normal engine start process is executed. In the normal engine start process, when the accelerator position opening APO exceeds an engine start line shown in FIG. 5 while the "EV mode" is selected, the engine start control is begun and the torque capacity of the second clutch 5 is controlled such that the second clutch 5 is put into slip engagement. When slippage of the second clutch 5 is determined to have begun, engagement of the first clutch 4 is begun and the engine rotational speed is increased by a cranking torque. When the engine rotational speed reaches a rotational speed at which initial explosion is possible, the engine 1 is made to undergo combustion operation and the first clutch 4 is engaged fully when the motor rotational speed and the engine rotational speed become nearly the same. Then, the second clutch 5 is fully engaged (locked up) to transition into the "HEV mode."

Meanwhile, if the determination of the forced backup start condition changes from not satisfied to satisfied after the engine start control begins, then the steps of the flowchart shown in FIG. 11 are executed as follows: step S511→step S514→step S515→step S514, with the second clutch 5 being fully engaged in step S514 from the point in time when the forced backup start condition is determined to be satisfied.

Next, if it is determined in step S515 that the drive force request from the driver is a deceleration request, then control proceeds from step S515 as follows: step S516→step S517→End. In step S516, the counter torque outputted by the motor/generator 2 is set to be smaller than the transmitted torque of the first clutch 4 (engine friction and inertia torque). In step S517, the engine 1 is cranked while providing a change rate limit in an engagement torque command for engaging the first clutch 4. When the starting of the engine 1 is completed, control proceeds to the end of the process.

Meanwhile, if it is determined in step S515 that the drive force request from the driver is not a deceleration request, then control proceeds from step S515 as follows: step S518→step S519→End. In step S518, the counter torque outputted from the motor/generator 2 is set to be larger than the transmitted torque of the first clutch 4 (engine friction and inertia torque). In step S519, the engine 1 is cranked while not providing a change rate limit in the engagement torque command for engaging the first clutch 4 when the second clutch 5 is fully engaged. When the starting of the engine 1 is completed, control proceeds to the end of the process.

Forced Backup Start Control Action

The action of the forced backup start control portion of the engine start control in the engine start control process explained heretofore will now be explained with reference to the time chart of FIG. 12.

For example, if the vehicle travels on a downhill grade (coasting downhill) in EV mode without the accelerator being operated while the vehicle is in the manual transmission mode with the first speed selected, then the vehicle speed will increase and the input rotational speed to the second clutch 5 will become high. If the driver performs an accelerator depression operation under these conditions, then a mode transition request for changing to the "HEV mode" will be issued and the engine start control will begin, thereby causing the second clutch 5 to be put into slip engagement while the input rotational speed to the second clutch 5 is high.

During slip-in control in the manual transmission mode while in first speed, the input rotational speed of the second clutch 5 (=motor rotational speed) is high and the upper limit torque of the motor/generator 2 declines. Consequently, the motor output torque from the motor/generator 2 will be insufficient with respect to the transmitted torque of the first clutch 4 (engine friction and inertia torque) and the input rotational speed of the second clutch 5 will decline. When the input rotational speed of the second clutch 5 declines, the output rotational speed of the second clutch exceeds the input rotational speed and the slip polarity of the second clutch 5 changes from positive slip to negative slip.

As explained previously, the time chart of FIG. 12 shows various characteristics when the slip polarity of the second clutch 5 changes from positive slip to negative slip after the engine start control begins. At a time t1, the driver begins an accelerator depression operation during EV travel as indicated by the driver requested drive force characteristic, and the motor rotational speed is high. At a time t2, the engine start control begins in response to a mode transition request to change to the "HEV mode" based on the accelerator depression operation of the driver. At the time t2, the slip polarity of the second clutch 5 is positive slip, as indicated by the clutch 2 rotational speed difference characteristic.

At a time t3, the slip polarity of the second clutch 5 changes from positive slip to negative slip because the motor rotational speed has reached a high rotational speed at the time t2 when the engine start control begins, and the negative slip is detected. At the time t3, the forced backup start condition is satisfied because the negative slip is detected and the second clutch 5 is controlled to full engagement as indicated by the clutch 2 capacity/engagement command characteristic. Also, as indicated by the clutch 1 engagement torque characteristic, increasing of the CL1 torque of the first clutch 4 is begun at the time t3 using the limited CL1 torque change rate.

At a time t4, the cranked up engine rotational speed matches the motor rotational speed. At a time t5, the CL1 torque that began rising at the time t3 reaches target for cranking and begins being maintained at the target CL1 torque. In a time region straddling the time t5, the engine rotational speed reaches a rotational speed at which initial explosion is possible and the engine 1 is made to start combustion operation. At a time t6, the engine 1 is rotating independently and a decrease of the motor torque (counter torque) applied since the time t2 is begun. At a time t7, the engine start control is completed with the second clutch 5 still fully engaged. At a time t8 occurring immediately after the time t7, the torque of the first clutch 4 is increased from the target CL1 torque to a fully engaged state as indicated by the clutch 1 engagement torque characteristic.

As explained above, when a mode transition request for changing from EV to HEV occurs in Embodiment 1, the engine start control is begun with the second clutch 5 in slip engagement. Furthermore, the control is configured such that a forced backup start control in which the second clutch 5 is put into a fully engaged state is executed after the engine start control starts if it is detected that the slip polarity of the second clutch 5 has changed to negative slip. That is, the engine start control is begun when the target drive force is a positive torque and the slip polarity of the second clutch 5 is positive slip due to an accelerator operation. However, if the slip polarity of the second clutch 5 changes to negative slip after the engine start control begins, then the forced backup start control is begun with the second clutch 5 in the fully engages state. The forced backup start control eliminates the rotational speed difference of the second clutch 5 to achieve a state in which changes of the slip polarity do not occur (fully engaged state). As result, a sudden shock caused by a change in the slip polarity (negative slip→zero slip, or negative slip→positive slip) is prevented.

In Embodiment 1, a change rate limit is provided in the engagement torque command of the first clutch 4 when a drive force request from the driver is a deceleration request while the forced backup start control is executed such that the second clutch 5 is fully engaged. That is, when the driver requests deceleration by performing an accelerator return operation during the forced backup start control, the shock sensitivity of the driver is high. Also, an effect of reducing the engine start shock by setting the second clutch 5 to slip engagement cannot be obtained when the second clutch 5 is fully engaged due to the forced backup start control being executed. For these reasons, there is a high demand for reducing shock when a deceleration request occurs during the forced backup start control. Therefore, by providing the change rate limit in the engagement torque command of the first clutch 4, a torque component exceeding the engagement capacity of the first clutch 4 can be prevented from being transmitted and a sudden torque fluctuation transmitted to the tires 7 and 7, i.e., the drive wheels, during cranking can be alleviated.

When a deceleration request from the driver does not occur during the forced backup start control, the shock sensitivity of the driver is lower than when a deceleration request occurs. Therefore, engine start responsiveness is given priority over shock prevention and the change rate limit is not provided in the engagement torque command of the first clutch 4.

Deceleration Realization Action with Respect to a Driver Deceleration Request

The deceleration realization action with respect to a deceleration request by a driver during the forced backup start control will now be explained with reference to the time chart of FIG. 13.

In FIG. 13, at a time t2 the engine start control is begun in response to a mode transition request to transition to the "HEV mode" due to an accelerator depression operation by the driver. At a time t4, the cranked up engine rotational speed matches the motor rotational speed. At a time t7, the engine start control ends with the second clutch 5 fully engaged.

During the period from the time t2 to the time t4, the counter torque outputted from the motor/generator 2 to counterbalance the torque transmitted to the first clutch 4 (engine friction and inertia torque) is set to be smaller than the torque transmitted to the first clutch 4 (region A of the motor torque characteristic shown in FIG. 13).

Thus, in Embodiment 1, when the drive force request from the driver is a deceleration request during the forced backup start control, counter torque outputted from the motor/generator 2 to counterbalance the torque transmitted to the first clutch 4 during cranking is set to be smaller than the torque transmitted to the first clutch 4.

That is, the relationship (torque transmitted to the first clutch 4)>(counter torque) is ensured and the counter torque is not allowed to exceed the torque transmitted to the first clutch 4 in the positive direction. Consequently, the torque difference between the torque transmitted to the first clutch 4 and the counter torque acts on the drive train as a braking torque. In this way, as shown in the region B of the longitudinal G characteristic of FIG. 13, the deceleration requested by the driver is realized by reducing the longitudinal G (deceleration G) in a stable fashion that takes into account dispersion.

When the driver does not issue a deceleration request during the forced backup start control, the counter torque from the motor/generator 2 is applied according to the relationship (torque transmitted to first clutch 4)≤(counter torque) such that a deceleration G is not produced (dotted line characteristic of the motor torque characteristic in FIG. 12).

Effects will now be explained. Effects that can be obtained with a hybrid vehicle control device according to Embodiment 1 are listed below.

(1) The hybrid vehicle control device comprises an engine 1, a motor (motor/generator 2), a first clutch 4, a second clutch 5 and an engine start control section. The first clutch 4 is disposed between the engine 1 and the motor (motor/generator 2). The second clutch 5 is disposed between the motor (motor/generator 2) and a drive wheel (tires 7 and 7). The engine start control section (FIG. 11) is configured to begin an engine start control when a mode transition request to change to a hybrid vehicle mode ("HEV mode") occurs due to an accelerator operation while traveling in an electric vehicle mode ("EV mode") in which the first clutch 4 is opened, the engine start control section begins engagement of the first clutch after slip engagement of the second clutch 4 is determined and starts the engine 1 using the motor (motor/generator 2) as a starter motor. The engine start control section (FIG. 11) having a negative slip detecting/predicting section (step S511) that is configured to detect or predict if a slip polarity of the second clutch 5 has transitioned from positive slip to negative slip after the engine start control has begun, and a forced backup start control section (step S514 to step S519) that is configured to start the engine with the second clutch 5 in a fully engaged state when a transition of the second clutch 5 to negative slip has been detected or predicted. As a result, when the slip polarity of the second clutch 5 transitions to negative after the engine start control has begun, the occurrence of a shock can be prevented.

(2) The forced back up start control section (step S514 to step S519) is configured to set the counter torque from the motor (motor/generator 2) that counterbalances the torque transmitted to the first clutch 4 during cranking to be smaller than the torque transmitted to the first clutch 4 when the drive force request from the driver is a deceleration request while the engine 1 is being started with the second clutch 5 in a fully engaged state (step S516). As a result, in addition to the effect explained in (1), the deceleration requested by the driver can be realized when the drive force request from the driver is a deceleration request during the forced backup start control.

(3) The forced back up start control section (step S514 to step S519) is configured to provide a change rate limit in the engagement torque command used to engage the first clutch 4 when the drive force request from the driver is a deceleration request while the engine 1 is being started with the second clutch 5 in a fully engaged state (step S517). As a result, in addition to the effect explained in (1) and (2), when the drive force request from the driver is a deceleration request the during the forced backup start control, a sudden torque fluctuation transmitted to the drive wheels (tires 7 and 7) during cranking can be alleviated.

Embodiment 2

Embodiment 2 is an example in which a transition of the slip polarity of the second clutch 5 to positive slip is predicted based on the motor rotational speed during the forced backup start control.

Engine Start Control Process Configuration

The configuration will now be explained. FIG. 14 shows the flow of the engine start control process executed by the integrated controller 20 according to Embodiment 2 during an EV→HEV mode transition request (engine start control means). The engine start control process configuration will be now explained based on FIG. 14. Since step S522 to step S529 are steps for the same processing as step S512 to step S519 of FIG. 11, an explanation of these steps will be omitted.

In step S521, in continuation of an EV→HEV mode transition request or a determination that the engine start control is in progress in step S523, a determination is made as to whether or not the motor rotational speed Nm is equal to or higher than a prescribed rotational speed Nms that is a prediction value for predicting a transition to negative slip. If YES (if the motor rotational speed Nm≥prescribed rotational speed Nms), then control proceeds to step S524. If NO (motor rotational speed Mn<prescribed rotational speed Nms), then control proceeds to step S522 (negative slip detection/prediction section). Since the power train system configuration, the control system configuration, the integrated controller configuration, the integrated control process configuration, and the integrated control process configuration are the same as in Embodiment 1, drawings and explanations of these configurations are omitted.

Start Condition Determination Action of the Forced Backup Start Control

The operational actions will now be explained. In Embodiment 1, after the engine start control has begun, the slip polarity of the second clutch 5 is monitored directly based on the slip amount and the forced backup start control is begun at a time occurring after it is detected that the slip polarity has changed from positive slip to negative slip.

Conversely, in Embodiment 2, after the engine start control has begun, the forced backup start control is begun at a time when it is predicted that the slip polarity of the second clutch 5 will change from positive slip to negative slip. How the change of the slip polarity of the second clutch 5 from negative slip to positive slip is accomplished will now be explained.

In Embodiment 2, the negative slip is estimated to occur when a deliverable motor output torque is equal to or below a torque at which the engine can be cranked. The occurrence of negative slip is then predicted based solely on the motor rotational speed without calculating a torque.

First, a negative slip estimation equation is as follows:

$$T_{mg} \leq I_{eng} \cdot d\omega_{eng}/dt + T_{eng\_f} \quad (1)$$

In the equation, Tmg is the deliverable motor output torque, I eng·dωeng/dt is the engine inertia torque, and Teng_f is the engine friction torque. Thus, the torque at which the engine can be cranked is obtained by adding the engine inertia torque and the engine friction torque.

Meanwhile, as shown in FIG. 15, a typical motor output torque characteristic is such that the torque is high in a low motor rotational speed region and the output torque decreases gradually as the motor rotational speed increases. Thus, taking the torque required during cranking indicated in the right-hand portion of the equation (1) (engine friction and inertia torques) as a motor output lower limit torque Tmo, a motor upper limit rotational speed Nmo is determined by the motor output torque characteristic show in FIG. 15. That is, the region above the motor upper limit rotational speed Nmo indicated with hatching in FIG. 15 is a region where the motor output torque is insufficient with respect to the torque required for cranking and the possibility of negative slip occurring is high. Therefore, the motor upper limit rotational speed Nmo is used as a determination reference threshold value for negative slip and the determination reference threshold value is multiplied by a safety factor that takes dispersion into account to obtain a value to be used as a prediction determination value (prescribed rotational speed Nms) for predicting a transition to negative slip.

Thus, in Embodiment 2, after the engine start control begins, the control proceeds from step S521 to step S524 of the flowchart shown in FIG. 14 when the motor rotational speed condition changes from not satisfied (motor rotational speed Nm<prescribed rotational speed Nms) to satisfied (motor rotational speed Nm≥prescribed rotational speed Nms). In step S524, the motor rotational speed condition is satisfied and the second clutch 5 is put into full engagement at the time when the slip polarity of the second clutch 5 is predicted to become negative slip, thereby beginning the forced backup start control.

As a result, in comparison with Embodiment 1 in which the forced backup start control is started from when the negative slip is detected, the shock occurring under circumstances in which the slip polarity of the second clutch 5 is will transition to negative slip after the engine start control has begun is reduced before the slip polarity changes to negative slip. Since the other operational actions are the same as Embodiment 1, explanations thereof are omitted.

Effects will now be explained. In the hybrid vehicle control device according to Embodiment 2, the effects explained below can be obtained.

(4) The negative slip detecting/predicting section (step S521) predicts that the slip polarity of the second clutch 5 will become negative slip when the motor rotational speed Nm of the motor (motor/generator 2), which equals the input rotational speed of the second clutch 5, reaches or exceeds the prescribed rotational speed Nms above which the torque required for cranking the engine 1 cannot be delivered (FIG. 14). In addition to the effects (1) to (3) of Embodiment 1, the shock occurring under circumstances in which the slip polarity of the second clutch 5 is will transition to negative slip is reduced in an effective manner by starting the forced backup start control based on a prediction of a transition to negative slip.

Heretofore, the hybrid vehicle control device of the present invention has been explained based on Embodiment 1 and Embodiment 2. However, the specific configuration is not limited to these embodiments. Design changes and additions are permissible so long the resulting configuration does not depart from the scope of the invention as defined by the claims.

In Embodiment 1, after the engine start control has begun, the negative slip detecting/predicting section (step S511) detects if the slip polarity of the second clutch 5 has actually transitioned from positive slip to negative slip based on the slip amount. In Embodiment 2, after the engine start control has begun, the negative slip detecting/predicting section (step S521) predicts if it is likely that the slip polarity of the second clutch 5 will transition from positive slip to negative slip based on the motor rotational speed. However, it is acceptable if the negative slip detecting/predicting section monitors the slip amount and a slip amount change gradient and predicts if the slip polarity of the second clutch will change to negative slip based on the slip amount. Also, it is acceptable for the negative slip detecting/predicting section to, for example, use a motor rotational speed determination value that is higher than the motor upper limit rotational speed Nmo used as the negative slip determination threshold value and detect if the slip polarity of the second clutch has become negative slip based on the motor rotational speed.

In Embodiment 1, the second clutch 5 is a gear selection engagement element provided in the automatic transmission 3 and is a clutch that is engaged for all of the transmission gears. However, it is acceptable for the second clutch to be a dedicated clutch that is provided independently between the motor and the automatic transmission, or a dedicated clutch that is provided independently between the automatic transmission and the drive wheel.

Embodiment 1 presents an example of the invention utilized in a rear-wheel drive hybrid vehicle having a one-motor/two-clutch type power train system with the first clutch disposed between the engine and the motor/generator. However, the present invention may also be utilized in a front-wheel drive hybrid vehicle having a one-motor/two-clutch type power train system.

The invention claimed is:

1. A hybrid vehicle control device comprising:
an engine;
a motor;
a first clutch disposed in a driving force transmission path between the engine and the motor;
a second clutch disposed in a driving force transmission path between the motor and a drive wheel; and
an engine start control section programmed to begin an engine start control when a mode transition request to change to a hybrid vehicle mode occurs due to an accelerator operation while traveling in an electric vehicle mode in which the first clutch is opened, the engine start control section beginning engagement of the first clutch after slip engagement of the second clutch is determined and starting the engine using the motor as a starter motor,
the engine start control section having a negative slip detecting/predicting section configured to detect or predict if a slip polarity of the second clutch has transitioned from positive slip to negative slip after the engine start control has begun and before the engine has started, and a forced backup start control section programmed to start the engine with the second clutch in a fully engaged state when a transition of the second clutch to negative slip has been detected or predicted.

2. The hybrid vehicle control device according to claim 1, wherein
the forced backup start control section is further programmed such that when the engine is to be started with the second clutch in the fully engaged state and a drive force request from a driver is a deceleration request, the forced backup start control section sets a counter torque from the motor for counterbalancing a torque transmitted to the first clutch during a cranking state such that the counter torque is smaller than the torque transmitted to the first clutch.

3. The hybrid vehicle control device according to claim 2, wherein
the forced backup start control section is further programmed such that when the engine is to be started with the second clutch in the fully engaged state and a drive force request from a driver is a deceleration request, the forced backup start control section sets a change rate limit in an engagement torque command for engaging the first clutch.

4. The hybrid vehicle control device according to claim 2, wherein
the negative slip detecting/predicting section is programmed to predict that the slip polarity of the second clutch will become negative when a motor rotational speed of the motor that is an input rotational speed of the second clutch reaches or exceeds a prescribed rotational speed at which a torque required for cranking the engine cannot be outputted.

5. The hybrid vehicle control device according to claim 1, wherein
the forced backup start control section is further programmed such that when the engine is to be started with the second clutch in the fully engaged state and a drive force request from a driver is a deceleration request, the forced backup start control section sets a change rate limit in an engagement torque command for engaging the first clutch.

6. The hybrid vehicle control device according to claim 5, wherein
the negative slip detecting/predicting section is programmed to predict that the slip polarity of the second clutch will become negative when a motor rotational speed of the motor that is an input rotational speed of the second clutch reaches or exceeds a prescribed rotational speed at which a torque required for cranking the engine cannot be outputted.

7. The hybrid vehicle control device according to claim 1, wherein
the negative slip detecting/predicting section is further programmed to predict that the slip polarity of the second clutch will become negative when a motor rotational speed of the motor that is an input rotational speed of the second clutch reaches or exceeds a prescribed rotational speed at which a torque required for cranking the engine cannot be outputted.

* * * * *